United States Patent
Pitchforth et al.

(10) Patent No.: US 10,143,279 B2
(45) Date of Patent: Dec. 4, 2018

(54) COLLAPSIBLE ROLLING LUGGAGE

(71) Applicant: Eddie Bauer LLC, Bellevue, WA (US)

(72) Inventors: Noah Pitchforth, Issaquah, WA (US); Andrew Turner, Issaquah, WA (US)

(73) Assignee: Eddie Bauer LLC, Bellevue, WA (US)

( * ) Notice: Subject to any disclaimer, the term of this patent is extended or adjusted under 35 U.S.C. 154(b) by 234 days.

(21) Appl. No.: 15/071,767

(22) Filed: Mar. 16, 2016

(65) Prior Publication Data

US 2016/0270496 A1 Sep. 22, 2016

Related U.S. Application Data

(60) Provisional application No. 62/134,119, filed on Mar. 17, 2015.

(51) Int. Cl.
*A45C 5/03* (2006.01)
*A45C 7/00* (2006.01)
(Continued)

(52) U.S. Cl.
CPC ............. *A45C 7/0036* (2013.01); *A45C 5/03* (2013.01); *A45C 5/14* (2013.01); *A45C 7/00* (2013.01); *A45C 7/0031* (2013.01); *A45C 13/04* (2013.01); *A45C 13/262* (2013.01); *B62B 5/06* (2013.01); *A45C 2005/035* (2013.01);
(Continued)

(58) Field of Classification Search
CPC .... A45C 5/03; A45C 5/14; A45C 7/00; A45C 7/0031; A45C 13/04; A45C 13/262; A45C 2005/035; A45C 2013/226; A45C 2013/265; A45C 2013/267; B62B 5/065; B62B 5/067; B62B 2202/24; B62B 5/06
See application file for complete search history.

(56) References Cited

U.S. PATENT DOCUMENTS

| 2,250,126 A | 7/1941 | Cross |
| 2,918,474 A | 12/1959 | Hughes |

(Continued)

FOREIGN PATENT DOCUMENTS

| CA | 2467685 | 4/2004 |
| CA | 2492588 | 7/2005 |

(Continued)

OTHER PUBLICATIONS

Official Action for Canada Patent Application No. 2,924,207, dated Feb. 20, 2017 3 pages.
(Continued)

*Primary Examiner* — Tri Mai
(74) *Attorney, Agent, or Firm* — Sheridan Ross P.C.

(57) ABSTRACT

The invention relates to a collapsible luggage bag that improves maneuverability of the bag when a user is towing the bag and collapses to a reduced size to improve portability. In particular, the invention relates to a handle that is slideably interconnected to one or more stays such that the upper ends of the stays change position along the length of the handle as the handle retracts into the luggage. Further, the handle disconnects from one or more of the stays such that the handle, stays, and other frame components collapse and lie in a common plane. This collapsibility improves the portability of the luggage bag when the internal volume of the luggage bag is not used to store items.

18 Claims, 12 Drawing Sheets

(51) Int. Cl.
*A45C 13/26* (2006.01)
*B62B 5/06* (2006.01)
*A45C 5/14* (2006.01)
*A45C 13/04* (2006.01)
*A45C 13/22* (2006.01)

(52) U.S. Cl.
CPC .. *A45C 2013/226* (2013.01); *A45C 2013/265* (2013.01); *A45C 2013/267* (2013.01); *B62B 5/065* (2013.01); *B62B 5/067* (2013.01); *B62B 2202/24* (2013.01)

(56) References Cited

U.S. PATENT DOCUMENTS

| | | | |
|---|---|---|---|
| 3,068,972 A | 12/1962 | Armstrong | |
| 3,172,680 A * | 3/1965 | Hire | B62B 1/12 280/655 |
| 4,036,336 A * | 7/1977 | Burtley | A45C 5/14 16/113.1 |
| 4,619,464 A * | 10/1986 | Hwang | B62B 3/02 16/113.1 |
| 4,655,329 A | 4/1987 | Kaneko | |
| 4,813,520 A | 3/1989 | Lin | |
| 5,323,886 A * | 6/1994 | Chen | A45C 5/143 16/113.1 |
| 5,452,778 A * | 9/1995 | Wang | A45C 13/262 16/113.1 |
| 5,749,446 A | 5/1998 | Hsieh | |
| 5,749,503 A | 5/1998 | Wulf et al. | |
| 5,799,851 A | 9/1998 | Wulf et al. | |
| 6,122,800 A | 9/2000 | Cheng | |
| 6,202,254 B1 | 3/2001 | Ezer | |
| 6,264,047 B1 * | 7/2001 | Crumley | A45C 13/03 190/102 |
| 6,267,393 B1 | 7/2001 | Mengrone et al. | |
| 6,279,706 B1 | 8/2001 | Mao | |
| 6,293,443 B1 | 9/2001 | Nykoluk | |
| D448,986 S | 10/2001 | Cook et al. | |
| 6,328,146 B1 | 12/2001 | Siwak | |
| 6,401,890 B1 | 6/2002 | Tan | |
| 6,427,836 B1 | 8/2002 | Bolanos | |
| 6,474,523 B2 | 11/2002 | Morrison et al. | |
| D469,679 S | 2/2003 | Nykoluk | |
| D471,488 S | 3/2003 | Nykoluk | |
| D473,716 S | 4/2003 | Nykoluk | |
| D474,597 S | 5/2003 | Nykoluk | |
| 6,561,395 B2 | 5/2003 | Lim et al. | |
| D475,199 S | 6/2003 | Nykoluk | |
| D477,916 S | 8/2003 | Nykoluk | |
| D478,024 S | 8/2003 | Nordstrom | |
| 6,612,411 B2 | 9/2003 | Nykoluk et al. | |
| 6,618,914 B1 | 9/2003 | Chen | |
| D480,874 S | 10/2003 | Nykoluk | |
| D481,206 S | 10/2003 | Nykoluk | |
| 6,629,588 B2 | 10/2003 | Nykoluk et al. | |
| 6,648,196 B2 | 11/2003 | Morrison et al. | |
| 6,651,791 B1 | 11/2003 | Nykoluk et al. | |
| D482,987 S | 12/2003 | Ritter | |
| D483,295 S | 12/2003 | Ritter | |
| D483,692 S | 12/2003 | Ritter | |
| D484,686 S | 1/2004 | Nordstrom et al. | |
| D486,647 S | 2/2004 | Nordstrom et al. | |
| 6,691,843 B2 | 2/2004 | Nykoluk et al. | |
| D488,929 S | 4/2004 | Nordstrom et al. | |
| D489,902 S | 5/2004 | Nykoluk | |
| D492,486 S | 7/2004 | Mullins | |
| D492,487 S | 7/2004 | Nykoluk | |
| D493,619 S | 8/2004 | Nykoluk | |
| D494,364 S | 8/2004 | Burgess et al. | |
| D495,623 S | 9/2004 | Nordstrom et al. | |
| 6,793,051 B2 | 9/2004 | Siwak | |
| D497,052 S | 10/2004 | Nykoluk | |
| D498,053 S | 11/2004 | Nordstrom et al. | |
| D500,966 S | 1/2005 | Mullins | |
| 6,839,939 B2 * | 1/2005 | Donakowski | B60B 3/048 16/18 R |
| 6,871,766 B2 | 3/2005 | Nordstrom | |
| D507,109 S | 7/2005 | Burgess et al. | |
| D507,113 S | 7/2005 | Nykoluk | |
| 6,918,474 B2 | 7/2005 | Nykoluk | |
| 6,926,129 B2 | 8/2005 | Hoberman | |
| 6,942,077 B1 | 9/2005 | Nykoluk | |
| 7,137,493 B2 | 11/2006 | Siwak | |
| 7,232,018 B1 | 6/2007 | Salander | |
| 7,281,615 B2 | 10/2007 | Siwak et al. | |
| 7,322,452 B2 | 1/2008 | Nykoluk | |
| 7,419,037 B2 | 9/2008 | Nordstrom | |
| 7,424,950 B2 | 9/2008 | Burgess et al. | |
| 7,500,560 B2 | 3/2009 | Fair et al. | |
| 7,614,628 B2 * | 11/2009 | O'Connor | A45C 5/143 280/37 |
| 7,832,532 B2 | 11/2010 | Nykoluk et al. | |
| 7,861,834 B2 | 1/2011 | Gorga et al. | |
| 7,901,018 B2 * | 3/2011 | Baughman | A47B 77/02 190/11 |
| 8,333,271 B2 * | 12/2012 | Gibson | A45C 9/00 190/102 |
| 8,549,705 B1 * | 10/2013 | Wu | B60B 37/10 16/31 A |
| 8,607,946 B2 | 12/2013 | Tamarkin | |
| 8,720,655 B2 | 5/2014 | King | |
| 2002/0050429 A1 | 5/2002 | Nykoluk et al. | |
| 2002/0153707 A1 * | 10/2002 | Kady | A45C 13/385 280/652 |
| 2003/0025287 A1 | 2/2003 | Kady | |
| 2003/0034636 A1 | 2/2003 | Ng | |
| 2003/0038009 A1 | 2/2003 | Chang | |
| 2005/0012287 A1 * | 1/2005 | Goldenberg | B62B 5/0438 280/47.38 |
| 2005/0153036 A1 | 7/2005 | Grelle et al. | |
| 2006/0026089 A1 | 2/2006 | Replanski et al. | |
| 2009/0071783 A1 | 3/2009 | Nykoluk | |
| 2010/0300825 A1 | 12/2010 | Nordstrom | |
| 2012/0006638 A1 * | 1/2012 | Semersky | A45C 13/262 190/115 |
| 2012/0255824 A1 | 10/2012 | Schnell et al. | |
| 2014/0027227 A1 * | 1/2014 | Stern | A45C 13/262 190/18 A |
| 2014/0116829 A1 | 5/2014 | Davis | |
| 2014/0291095 A1 | 10/2014 | Boldetti et al. | |
| 2014/0299431 A1 | 10/2014 | Lusson | |

FOREIGN PATENT DOCUMENTS

| | | |
|---|---|---|
| CN | 1655702 | 8/2005 |
| CN | 101686745 | 3/2010 |
| CN | 201419723 | 3/2010 |
| CN | 101773327 | 7/2010 |
| CN | 202354619 | 8/2012 |
| CN | 103180195 | 6/2013 |
| CN | 103287203 | 9/2013 |
| DE | 202014101046 | 7/2014 |
| EP | 1446030 | 8/2004 |
| EP | 1529461 | 5/2005 |
| GB | 1185339 | 3/1970 |
| GB | 2451231 | 1/2009 |
| JP | 2005137902 | 6/2005 |
| JP | 2006517418 | 7/2006 |
| JP | 2014046930 | 3/2014 |
| JP | 2014097387 | 5/2014 |
| KR | 200164138 | 2/2000 |
| KR | 20050034630 | 4/2005 |
| TW | 408581 | 10/2000 |
| WO | WO 9934702 | 7/1999 |
| WO | WO 02071887 | 9/2002 |
| WO | WO 02071888 | 9/2002 |
| WO | WO 2004/063030 | 7/2004 |
| WO | WO 2004/080228 | 9/2004 |
| WO | WO 2004/081904 | 9/2004 |
| WO | WO 2009/075781 | 6/2009 |

(56) References Cited

FOREIGN PATENT DOCUMENTS

WO    WO 2009/085334    7/2009
WO    WO 2013/192595    12/2013

OTHER PUBLICATIONS

Extended Search Report for European Patent Application No. 16161013.4, dated Jul. 7, 2016 7 pages.
Official Action for European Patent Application No. 16161013.4, dated Aug. 29, 2017 4 pages.

* cited by examiner

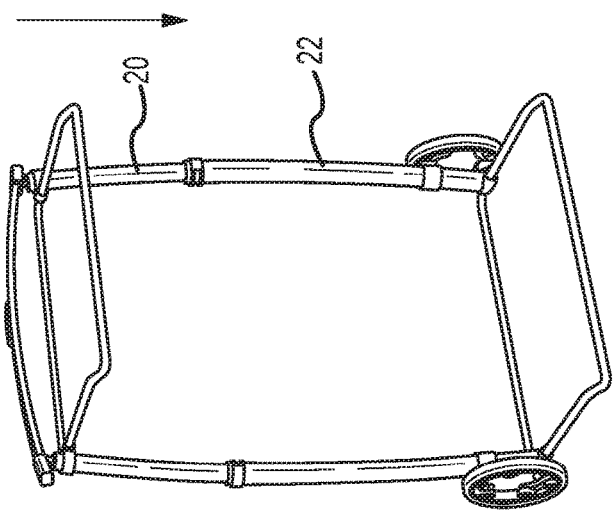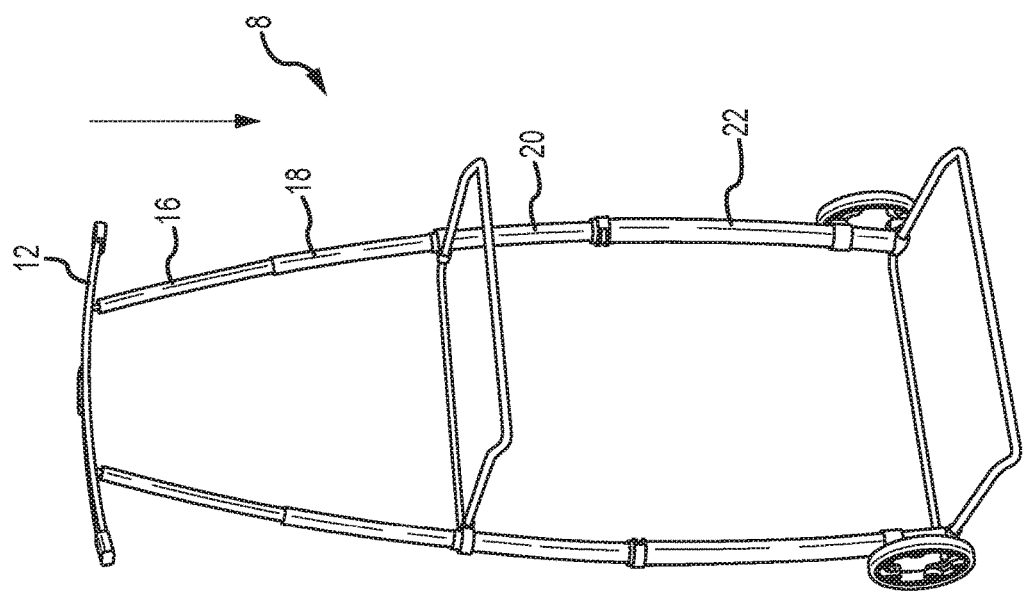

COLLAPSIBLE ROLLING LUGGAGE

CROSS-REFERENCE TO RELATED APPLICATIONS

This application claims priority under 35 U.S.C. § 119(e) to U.S. Provisional Patent Application Ser. No. 62/134,119 filed Mar. 17, 2015, which is incorporated herein in its entirety by reference.

FIELD OF THE INVENTION

The invention relates to luggage bags that comprise a handle for towing, and more specifically relates to luggage bags with a retractable handle and hubless wheels.

BACKGROUND

Carrying heavy bags for an extended period of time or distance can tire or even injure a user. Larger luggage bags are often outfitted with wheels so that a user has the option of rolling the luggage bag across the ground. This reduces the amount of weight carried by the user, which is helpful when traveling through an airport terminal or a downtown area.

Luggage bags with wheels often include a handle to aid the user when he or she is rolling a luggage bag across the ground. It is advantageous to have the handle extend from the bag so that a user may walk with a normal gait while towing the luggage bag. However, a handle that is permanently extended from the bag reduces the portability of the bag and makes the bag cumbersome to store, for example, in the storage section of an airplane or a car, etc. Therefore, luggage bags with handles typically have handles that can extend from the bag when the user is towing the bag and retract into the bag when the user needs to store the bag.

Examples of prior art luggage bags may be found in U.S. Pat. Nos. D493,619, 7,322,452, 6,918,474, 7,832,532, 6,651,791, D489,902, D475,199, 6,942,077, D507,109, D492,487, which are incorporated herein by reference in their entireties. These references generally describe a handle connected to a bag via a single extendable towing member wherein the handle is rotatably interconnected to the towing member. The prior art luggage bags and their handle configurations are inherently unstable when a user is negotiating a turn. If the user makes a sharp turn while towing the luggage bag, then the user pulls the handle laterally across the bag such that the bag tips over onto its side.

In addition, the prior art luggage bags cannot fold or collapse into a smaller size due to the rigid frames of the bags. Therefore, while the handle and towing member may retract into the luggage bag, the size the luggage bag is limited by the rigid frame of the bag. In a similar vein, the prior art luggage bags comprise wheels that are connected to the bag or the rigid frame of the bag via an axle, a hub, or a caster system. These wheel connections make it difficult to move or rotate portions of the frame relative to each other to collapse the bag into a smaller size.

Therefore, there is an unmet need for a luggage bag that is stable while turning and collapsible beyond the normal dimensions of the luggage bag and/or the frame of the luggage bag.

SUMMARY OF THE INVENTION

These and other needs are addressed by the various embodiments and configurations of the invention. This disclosure relates to a novel system, device, and method for providing a luggage bag with a frame system that improves the maneuverability of the bag and collapses to a reduced size to improve the portability of the bag.

One aspect of the invention is to provide a collapsible luggage bag that has a handle slideably interconnected to one or more stays. In various embodiments of the invention, stays extend from the luggage bag, and a handle is disposed on the upper end of the one or more stays. The one or more stays may be in a non-perpendicular orientation relative to the handle when the handle is extended. Therefore, in one embodiment the ends of the one or more stays are located proximate to the ends of the handle when the stays are retracted into the bag, and the stay ends are located at an intermediate section of the handle when the stays are extended from the bag. Since the stays are located at an intermediate section, the user has more ways to grasp the handle and negotiate a sharp turn without tipping the luggage bag over.

Another aspect of the invention is to provide a collapsible luggage bag that has a frame that collapses into a reduced size. In some embodiments, the one or more stays not only retract into the bag, the stays also collapse and fold down such that the stays lie in a common plane with other components of the frame such as the handle. In some embodiments, the handle is slideably interconnected to the one or more stays. The handle may also disconnect from one stay, then rotate flat against another stay such that the stays and the handle lie in a common plane. It will be appreciated that other frame structures that provide rigidity to the luggage bag may be disassembled or otherwise folded such that the frame is collapsed into a reduced size wherein the components of the frame generally lie in a common plane.

One aspect of the invention is to provide a collapsible luggage bag and a method of use wherein the frame system, including the stays and handle, is selectively interconnected to the bag. In this configuration, the bag may be detached from the frame and carried similar to a duffel bag. This configuration also allows the frame to separate from the bag, collapse into a smaller size, and then store in one of the pockets of the bag.

Yet another aspect of the invention is to provide a collapsible luggage bag that has one or more hubless wheels. In various embodiments, one or more connection members provide a link between the one or more stays and a plurality of attachment members about which a wheel may rotate. Since the connection members are interconnected to the one or more stays, the hubless wheel folds along with the one or more stays when the luggage bag is collapsed. Thus, the hubless wheel lies in a common plane with the other frame components. The configuration of the hubless wheel also allows for a reduction in weight since components such as axles and hubs are not required.

In various embodiments of the invention, the slideable interconnection between the handle and the stays allows the upper ends of the stays to travel along the longitudinal length of the handle. The underside of the handle may comprise one or more channels where the upper ends of the stays are disposed. A sliding element may be disposed in the channel wherein the sliding element is received in a pair of recesses that traverse the longitudinal length of the channel. The stay ends may interconnect to the sliding element via a ball-and-socket joint. In other embodiments, the stay ends directly interconnect to the channel via opposed protrusions that extend from the stay end.

One particular embodiment of the invention is a collapsible luggage bag system, comprising a bag having an internal volume; a frame selectively interconnected to an exterior surface of the bag, including a first stay having a retracted position and an extended position relative to the bag; a second stay having a retracted position and an extended position relative to the bag; a handle slideably interconnected to an upper end of the first stay and an upper end of the second stay, the upper ends of the stays are configured to slide along a longitudinal length of the handle as the stays move between the retracted positions and the extended positions; and wherein the handle is configured to selectively disconnect from the upper end of the first stay and reposition against the second stay such that the frame stores in the internal volume of the bag.

Embodiments of the invention may have several slideable features. In various embodiments, a slideable element positioned in a channel on the handle, the channel oriented along the longitudinal length of the handle, wherein the upper ends of the stays are rotatably interconnected to the slideable element. In some embodiments, a channel is on the handle, the channel oriented along the longitudinal length of the handle, wherein opposing protrusions on the upper ends of the stays are positioned in recesses in the channel such that the upper ends of the stays slide along the longitudinal length of the handle. In various embodiments, a channel is on the handle, the channel oriented along the longitudinal length of the handle, wherein a protrusion on the upper end of the first stay and a protrusion on the upper end of the second stay are positioned in the channel such that the upper ends of the stays slide along the longitudinal length of the handle.

Embodiments of the invention may also have several stay features. In some embodiments, the first stay and the second stay each comprise a plurality of telescoping elements which allow selective retraction and extension of the stays. In various embodiments, a clamp selectively fixes relative positions of two elements of the plurality of telescoping elements. In various embodiments, the first stay extends upwardly from the bag, and has an inwardly orientated arcuate shape. In some embodiments, the first stay and the second stay are symmetric to each other about a vertical plane that bisects the bag.

Embodiments of the invention may have hubless wheels. In various embodiments, a first hubless wheel is on the first stay, wherein the first hubless wheel is configured to lie in the substantially common plane with the frame and is sized to be stored in the internal volume of the bag; and a second hubless wheel is on the second stay, wherein the second hubless wheel is configured to lie in the substantially common plane with the frame and is sized to be stored in the internal volume of the bag.

Another particular embodiment of the invention is a method of storing a luggage frame in a collapsible luggage bag, comprising (i) providing a first stay having a retracted position and an extended position; (ii) providing a second stay having a retracted position and an extended position; (iii) providing a handle slideably interconnected to an upper end of the first stay and an upper end of the second stay, the upper ends of the stays slide along a longitudinal length of the handle as the stays move between the retracted positions and the extended positions; (iv) disconnecting the first stay from the handle and repositioning the handle against the second stay; and folding the first and second stays against a bottom frame member, wherein the first stay, the second stay, the bottom frame member, and the handle are repositioned in a substantially common plane to allow positioning in the perimeter confines of a bag.

Embodiments of the invention may have several slideable features. In some embodiments, the method may further comprise (v) selectively interconnecting the luggage frame to at least one attachment point on an exterior surface of the bag. In various embodiments, the method may further comprise (vi) positioning a slideable element in a channel on the handle, the channel oriented along the longitudinal length of the handle, wherein the upper ends of the stays are rotatably interconnected to the slideable element. In some embodiments, the method may further comprise (vii) sliding opposing protrusions on the upper ends of the stays in recesses in a channel on the handle such that the upper ends of the stays slide along the longitudinal length of the handle, wherein the channel is oriented along the longitudinal length of the handle. In various embodiments, the method may further comprise (viii) sliding a protrusion on the upper ends of the stays in a channel on the handle such that the upper ends of the stays slide along the longitudinal length of the handle, wherein the channel is oriented along the longitudinal length of the handle.

Embodiments of the invention may also have several stay features. In some embodiments, the first stay and the second stay each comprise a plurality of telescoping elements which allow selective retraction and extension of the stays. In various embodiments, the method may further comprise (ix) selectively fixing, with a clamp, relative positions of two elements of the plurality of telescoping elements. In some embodiments, the first stay extends upwardly from the bag, and has an inwardly orientated arcuate shape. In various embodiments, the first stay and the second stay are symmetric to each other about a vertical plane that bisects the bag. In some embodiments, the method may further comprise (x) providing a first hubless wheel on the first stay, wherein the first hubless wheel is configured to lie in the substantially common plane with the frame and is sized to be stored in the internal volume of the bag; and (xi) providing a second hubless wheel on the second stay, wherein the second hubless wheel is configured to lie in the substantially common plane with the frame and is sized to be stored in the internal volume of the bag.

A further particular embodiment of the invention is a collapsible luggage bag system, comprising a bag having an internal volume; a frame selectively interconnected to an exterior surface of the bag, including: a first stay having a retracted position and an extended position relative to the bag, the first stay comprises a plurality of telescoping elements, wherein the first stay extends upwardly from the bag; a second stay having a retracted position and an extended position relative to the bag, the second stay comprises a plurality of telescoping elements, wherein the second stay extends upwardly from the bag; a handle having a channel oriented along a longitudinal length of the handle, wherein a protrusion on an upper end of the first stay and a protrusion on an upper end of the second stay are positioned in the channel such that the upper ends of the stays slide along the longitudinal length of the handle as the stays move between the retracted positions and the extended positions; a first hubless wheel on the first stay; a second hubless wheel on the second stay; and wherein the handle is configured to selectively disconnect from the upper end of the first stay and reposition against the second stay such that the frame lies in substantially common plane and allows for selective storage in the internal volume of the bag.

The Summary of the Invention is neither intended nor should it be construed as being representative of the full extent and scope of the invention. The invention is set forth in various levels of detail in the Summary of the Invention as well as in the attached drawings and the Detailed Description of the Invention and no limitation as to the scope of the invention is intended by either the inclusion or non-inclusion of elements or components. Additional aspects of the invention will become more readily apparent from the Detailed Description, particularly when taken together with the drawings.

The above-described embodiments, objectives, and configurations are neither complete nor exhaustive. As will be appreciated, other embodiments of the invention are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

BRIEF DESCRIPTION OF THE DRAWINGS

The accompanying drawings, which are incorporated in and constitute a part of the specification, illustrate embodiments of the invention and together with the Summary of the Invention given above and the Detailed Description of the drawings given below, serve to explain the principles of these embodiments. In certain instances, details that are not necessary for an understanding of the invention or that render other details difficult to perceive may have been omitted. It should be understood, of course, that the invention is not necessarily limited to the particular embodiments illustrated herein. Additionally, it should be understood that the drawings are not necessarily to scale.

FIG. 3A is a perspective view of a frame system with stays in an extended state;

FIG. 3B is a perspective view of a frame system with stays in a retracted state;

Figure 1A:
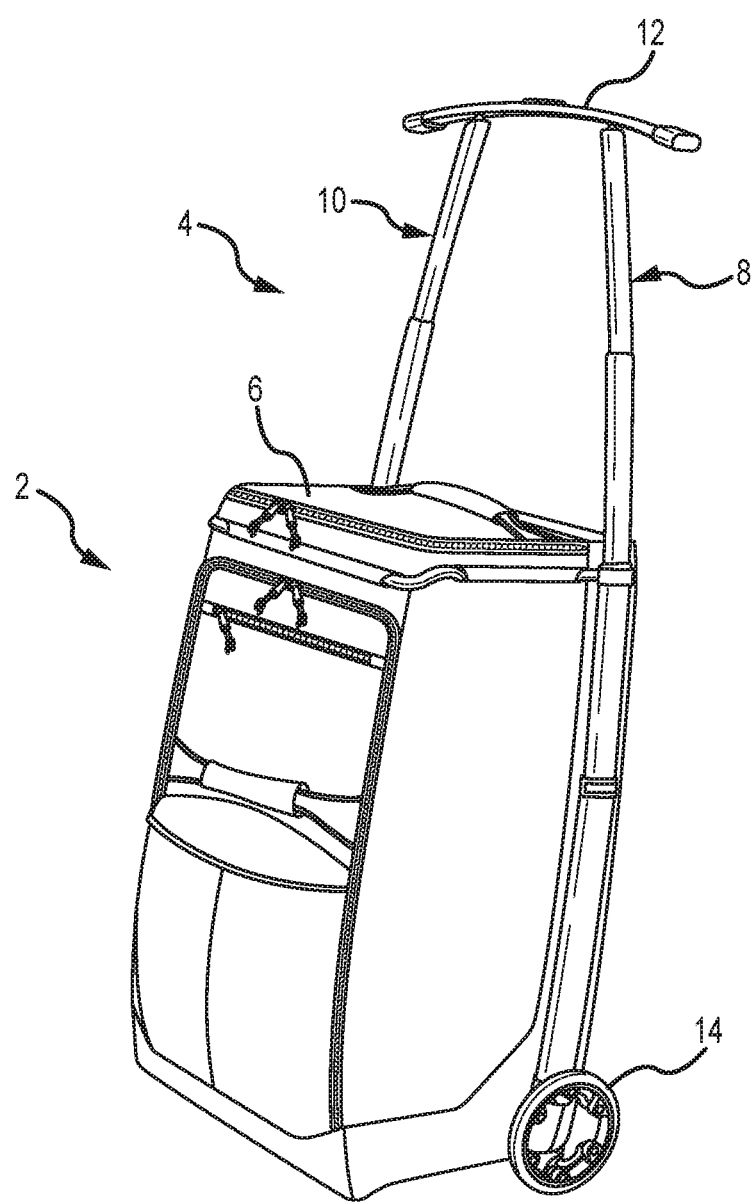
FIG. 1A is a perspective view of a collapsible luggage bag having a frame system and a bag with a top pocket.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

| Number | Component |
| --- | --- |
| 2 | Bag |
| 4 | Frame |
| 6 | Top Pocket |
| 8 | First Stay |
| 10 | Second Stay |
| 12 | Handle |
| 14 | Wheel |
| 16 | First Element |
| 18 | Second Element |
| 20 | Third Element |
| 22 | Fourth Element |
| 24 | Clamp |
| 26 | Top Frame Member |
| 28 | Bottom Frame Member |
| 30 | Quick-Release Button |
| 32 | Main Opening |
| 34 | Grab Handle |
| 36 | Accessory Pocket |
| 38 | Channel |
| 40 | Stay End |
| 42 | Top Connection Member |
| 44 | Bottom Connection Member |
| 46 | Attachment Member |
| 48 | Arm |
| 50 | Protrusion |
| 52 | Aperture |
| 54 | Frame Height |
| 56 | Frame Width |

| Number | Component |
| --- | --- |
| 58 | Frame Depth |
| 60 | Top Elements Height |
| 62 | Bottom Elements Height |

DETAILED DESCRIPTION

The invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the invention are described herein and as depicted in the drawings. It is expressly understood that although the figures depict collapsible luggage bags with a stay system and hubless wheels, the invention is not limited to these embodiments.

Figure 1B:
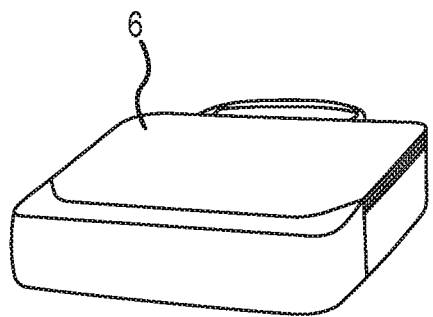
FIG. 1B is a perspective view of a collapsible luggage bag wherein the frame system and the bag are collapsed into the top pocket of the bag.

Now referring to FIGS. 1A-1B, a collapsible luggage bag 2 with a frame system 4 and a top pocket 6 is provided. FIG. 1A shows the collapsible luggage bag 2 and frame system 4 in a fully assembled configuration. FIG. 1B shows the collapsible luggage bag 2 and frame collapsed into the pocket 6 disposed on the top surface of the bag 2.

The collapsible luggage bag 2 shown in FIG. 1A has several components that allow the bag 2 to collapse into the top pocket 6. The frame system 4 comprises a first stay 8 and a second stay 10 disposed on opposing sides of the bag 2. These stays 8, 10 are collapsible along their longitudinal length for storage in the top pocket 6. In the embodiment depicted in FIG. 1A, the stays 8, 10 comprise a plurality of nested elements such that the stays 8, 10 are telescoping in nature. However, it will be appreciated that the stays 8, 10 are not limited to this specific embodiment. For example, in another embodiment the stay elements are hingedly interconnected to each other such that the stay elements fold against each other. In yet another embodiment, the stays 8, 10 do not comprise a plurality of elements. Rather, each stay 8, 10 comprises a single, flexible element that may be folded against itself to store within the top pocket 6.

A handle 12 is disposed at the upper ends of the stays 8, 10 in FIG. 1A. As described in further detail below, the handle 12 is slideably interconnected to the stays 8, 10 via a channel disposed on the underside of the handle 12. This allows the upper ends of the stays 8, 10 to travel along the longitudinal length of the handle 12 as the stays 8, 10 extend and retract.

Also depicted in FIG. 1A is a wheel system 14 that does not include a hub. This wheel system 14 is described in further detail below. Embodiments of the invention are not necessarily limited to the depicted wheel system 14. Other traveling means include a caster wheel, a ski, a tread, and any other similar traveling means.

Figure 2A:
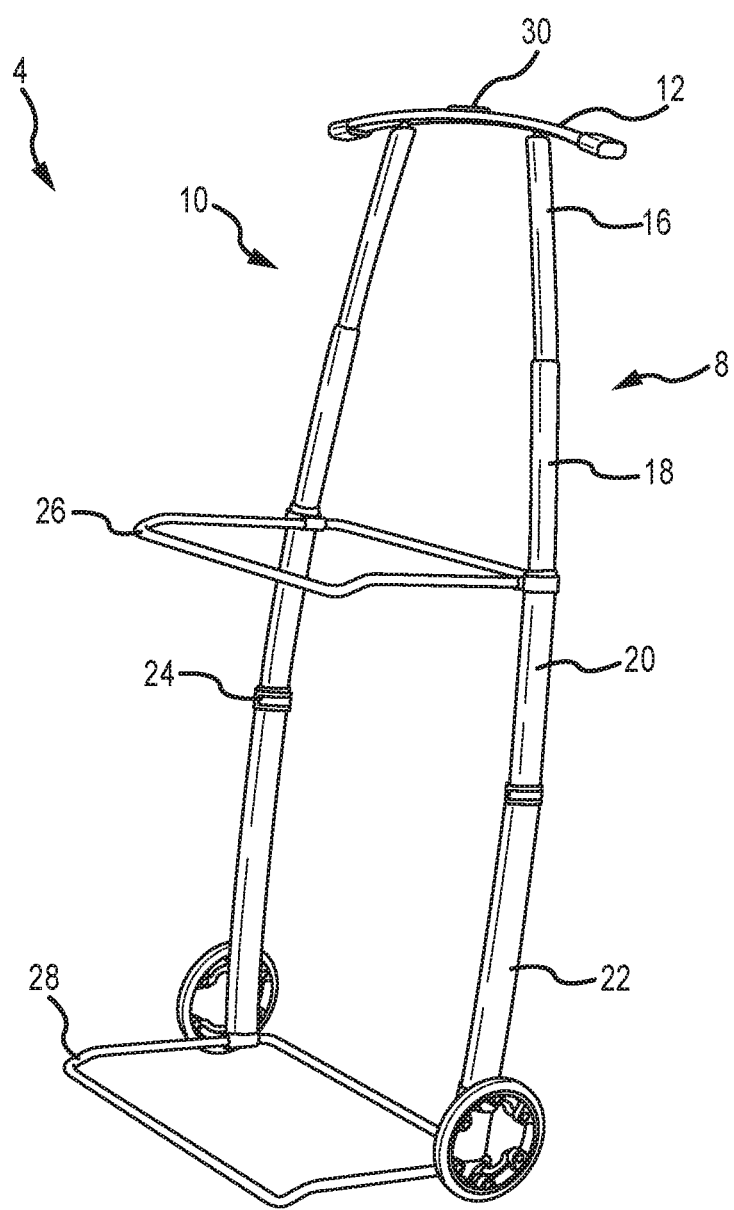
FIG. 2A is a perspective view of a frame system of a collapsible luggage bag.

Now referring to FIG. 2A, a more detailed illustration of the frame system 4 is provided. The first stay 8 comprises a first element 16 and a second element 18 associated with the handle 12. During use of the bag 2, for example in an airport, the user may extend and retract the first and second elements 16, 18 to alternate between a fully extended handle 12 and a handle 12 that is generally flush with an edge or surface of the bag 2.

When the first and second elements 16, 18 are collapsed, they are disposed in a third element 20 and fourth element 22, which generally run along the longitudinal length of the bag 2, The elements 16, 18, 20, 22 are nested within each other and are telescoping in nature. A clamp 24 disposed on the upper end of the fourth element 22 dictates the relative positioning between the third element 20 and the fourth element 22. When the clamp 24 is in a closed state, the positions of the third and fourth elements 20, 22 are fixed relative to each other. When the 24 clamp is in an open state, the third and fourth elements 20, 22 are free to move relative to each other. The stays 8, 10 are symmetric in the embodiment in FIG. 2A, and thus, both stays 8, 10 comprise four nested elements. However, it will be appreciate that both stays 8, 10 are not identical in every embodiment of the invention.

Next, a top member 26 is generally disposed at the upper end of the third element 20 and a bottom member 28 is generally disposed at the bottom of the fourth element 22. These members 26, 28 may selectively interconnect to attachment points on the bag 2 to provide rigidity to the bag 2. Further, a quick-release button 30 is positioned on top of the handle 12 such that a user may engage the quick-release button 30 and collapse the first and second elements 16, 18 into the third and fourth elements 20, 22. In the embodiment depicted in FIG. 2A, the second stay 10 is symmetric with the first stay 8 about a vertical plane that bisects the bag 2 and frame 4. However, it will be appreciated that in some embodiments one or more stays are not necessarily symmetric about a plane or axis.

While the embodiment in FIG. 2A has four elements 16, 18, 20, 22, the invention is not limited to this configuration. For example, the first stay 8 may comprise one element, two elements, three elements, five elements, etc. Further, the number of stays is not limited to two. Other embodiments may have one stay, three stays, four stays, etc. The first stay 8 in FIG. 2A and the four elements 16, 18, 20, 22 are curved. Generally, the first stay 8 extends upward and curves over the bag 2 toward the second stay 10. It will be appreciated that the first stay 8 may be straight or curved in other directions such as behind the bag 2 toward the user or away from the second stay 10.

In addition, the first stay 8 may curve inwardly in an arcuate shape, or along a predetermined radius of curvature. In some embodiment, the radius of curvature is between approximately 20" and 100" (50.8 cm to 254 cm), wherein "approximately" implies a variation of +/−10%. In various embodiments, the radius of curvature is between approximately 30" and 50" (76.2 cm to 127 cm). In one embodiment, the radius of curvature is approximately 40" (101.6 cm).

Figure 2B:
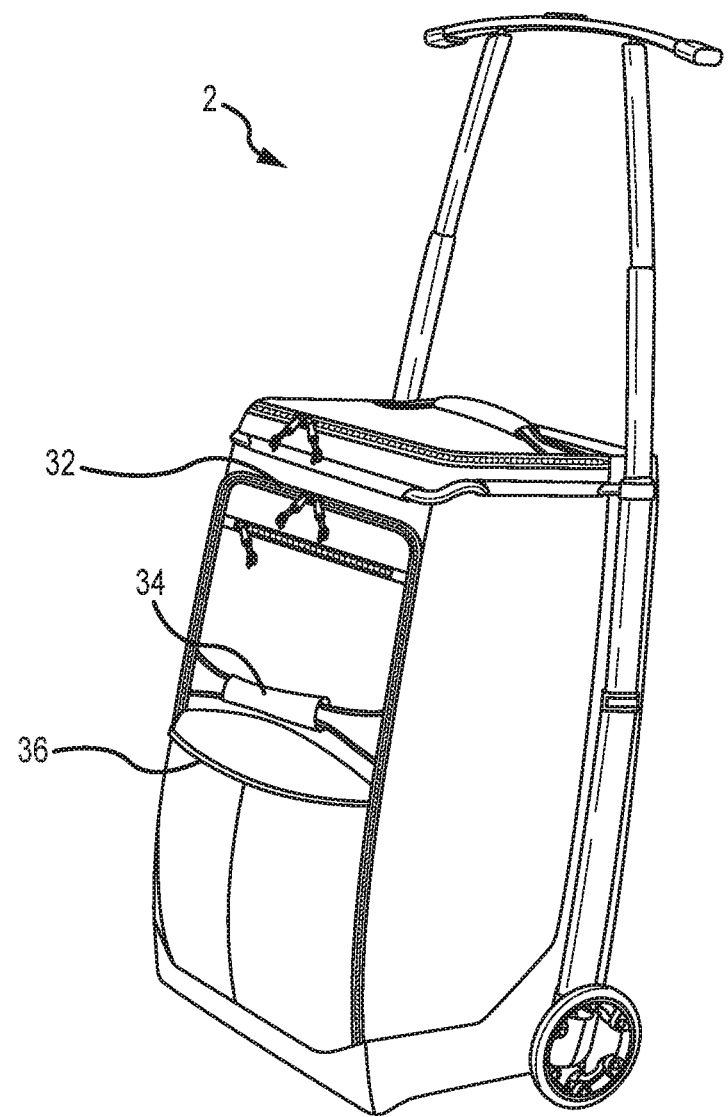
FIG. 2B is a perspective view of a collapsible luggage bag having a frame and a bag with a top pocket.

FIG. 2B shows various components of the bag 2. A main opening 32 is positioned on the front side of the bag 2 to provide access to the internal volume of the bag 2. A grab handle 34 is also positioned on the front side of the bag 2. A user may carry the bag 2 via the grab handle 34 when the first and second elements 16, 18 are collapsed or when the bag 2 and frame 4 are completely collapsed into the top pocket 6. In addition, an accessory pocket 36 is disposed on the front side of the bag 2 to provide additional storage space. It will be appreciated that the term "internal volume" may be synonymous with any pockets of the bag 2 or portions defined by the bag 2.

The bag 2 may be selectively interconnected to the frame as shown in FIG. 2B. The bag 2 may comprise loops, Velcro®, snap fasteners, sleeves, screws, bolts, twist ties, or any other similar means or attachment points to selectively interconnect the bag 2 to the frame. However, embodiments of the invention are not limited to this embodiment. In various embodiments, the bag 2 may be integrated with the frame.

Figure 3C:
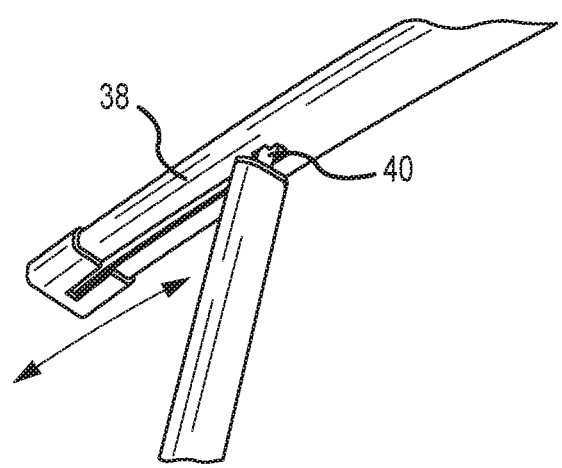
FIG. 3C is a perspective view of a slideable interconnection between a stay and a handle.

Now referring to FIGS. 3A-3C, a depiction of the first and second elements 16, 18 retracting is provided. FIG. 3A shows the frame 4 in a fully assembled state where the first and second elements 16, 18 are extended. In this state, the first element 16 slideably interconnects to the handle 12 at an intermediate portion of the handle 12.

FIG. 3B shows the first and second 16, 18 elements retracted into the third and fourth elements 20, 22 such that the handle is proximate to the upper end of the third element 20. In this retracted state, the first element 16 is slideably interconnected to the handle 12 at an end of the handle 12. In other words, as the first and second elements 16, 18 are retracted into the third and fourth elements 20, 22, an end of the first element 16 slides along the longitudinal length of the handle 12.

FIG. 3C illustrates the slideable interconnection between the first element 16 and the handle 12. A channel 38 is disposed on the underside of the handle 12. An upper end 40 of the first element 16 is disposed within the channel 38 and travels in the longitudinal direction of the channel 38. The upper end 40 may comprise two opposing protrusions that extend into two longitudinal recesses in the channel 38. In another embodiment, a sliding element is disposed in the channel 38 and is slideably interconnected to the handle 12. The upper end 40 of the first element 16 may be interconnected to the sliding element in a number of ways, including, but not limited to a ball-and-socket joint, a hinged interconnection, a rotatable interconnection, a fixed interconnection, etc. Further still, a protrusion or ball may be disposed on the upper ends of the stays, and the protrusion allows for linear motion in a channel on the underside of the handle 12. It will be appreciated that one or more channels 38 may be utilized to provide the slideable movement of the upper ends of the stays along the longitudinal length of the handle 12.

Figure 4A:
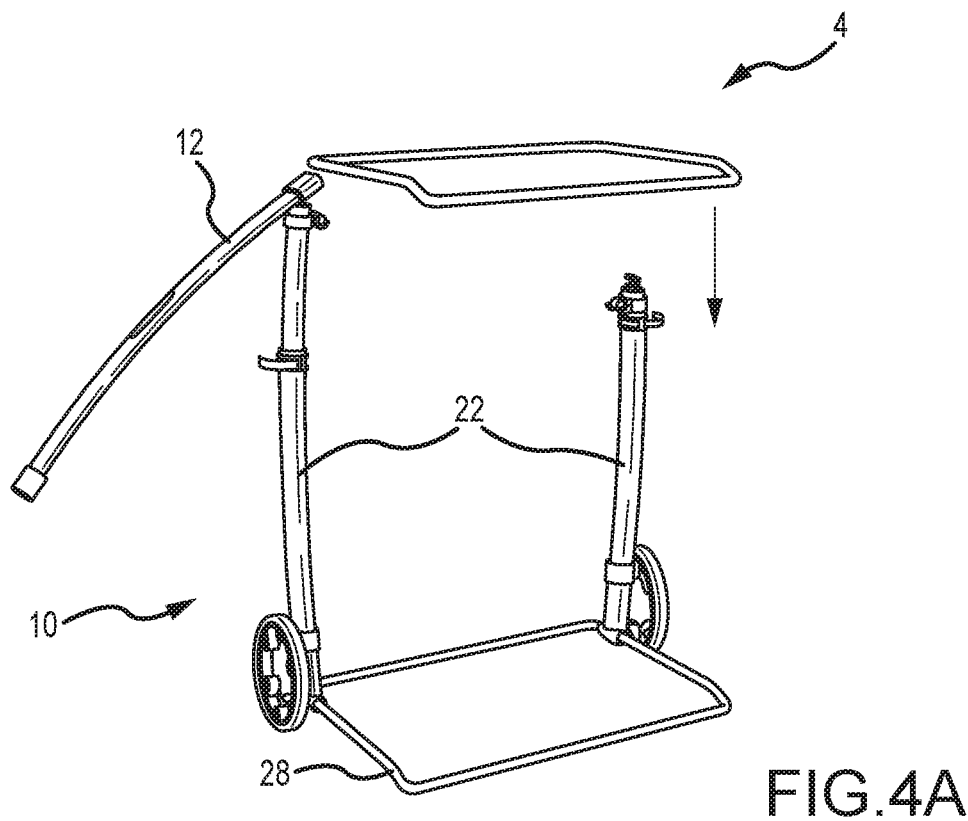
FIG. 4A is a perspective view of a frame system with collapsed stays.
Figure 4B:
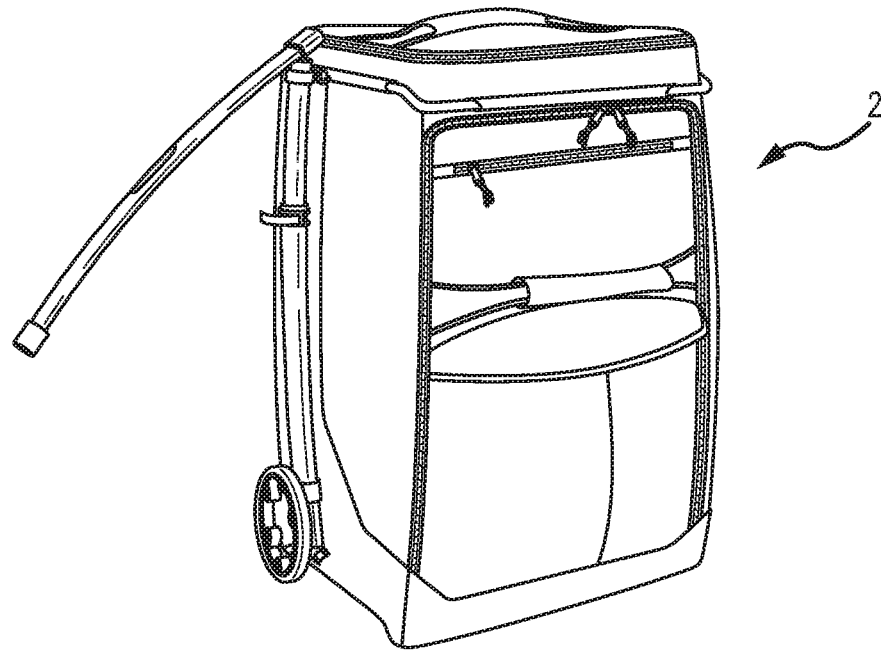
FIG. 4B is a perspective view of a collapsible luggage bag with collapsed stays.

Now referring to FIGS. 4A-6C, an illustration of the bag 2 and frame 4 collapsing into the top pocket 6 of the bag 2 is provided. In FIGS. 4A-4B, the first, second, and third elements 16, 18, 20 have been retracted into the fourth element 22. A user may release the clamp 24 to allow the third element 20 to collapse into the fourth element 22. Next, a user may disengage the upper end of the first stay 8 from the handle 12 such that the handle 12 is allowed to rotate freely about the upper end of the second stay 10. In alternative embodiments, the upper end of the second stay 10, the upper ends of both stays, 8, 10, or neither of the stays 8, 10 disengage from the handle 12. FIG. 4B also shows the bag 2 selectively interconnected to the frame 4.

Figure 5A:
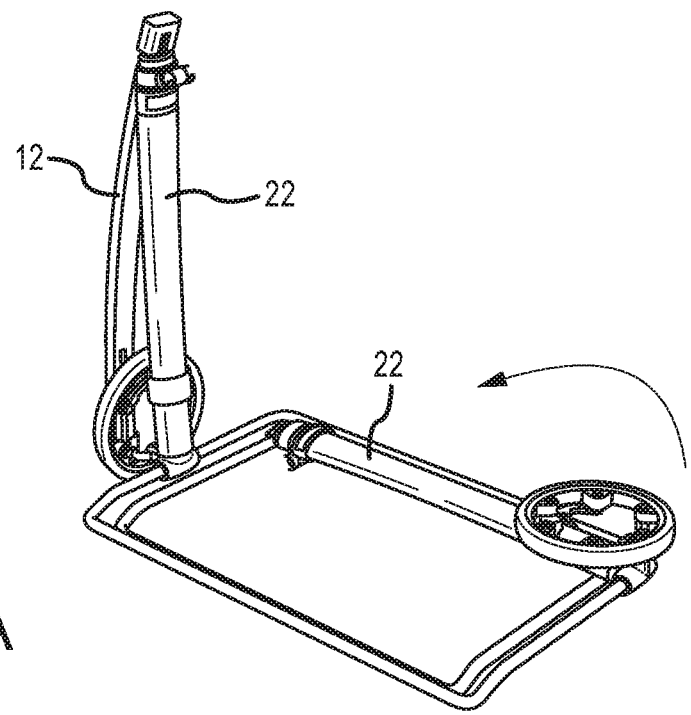
FIG. 5A is a perspective view of a frame system wherein the collapsed stays are rotated into a common plane.
Figure 5B:
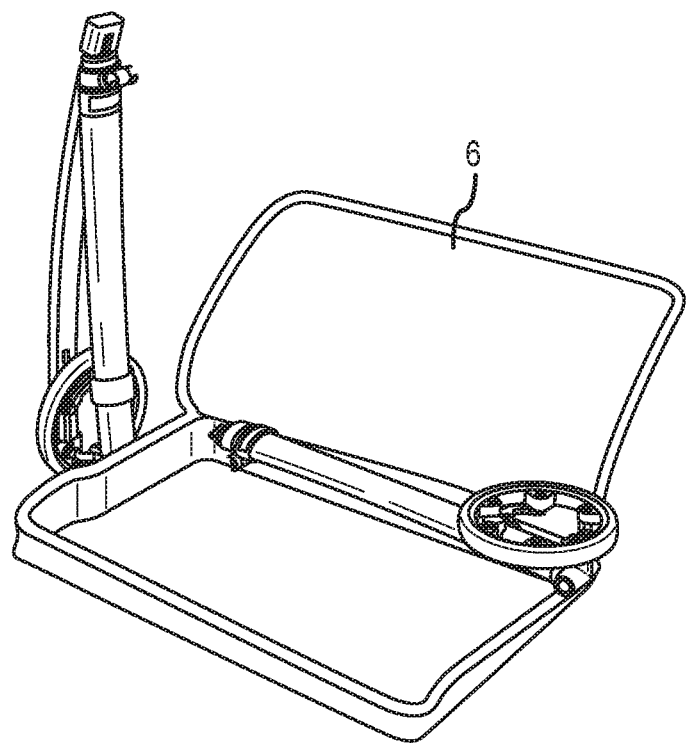
FIG. 5B is a perspective view of a collapsible luggage bag wherein the collapsed stays are rotated into a common plane.
Figure 6A:
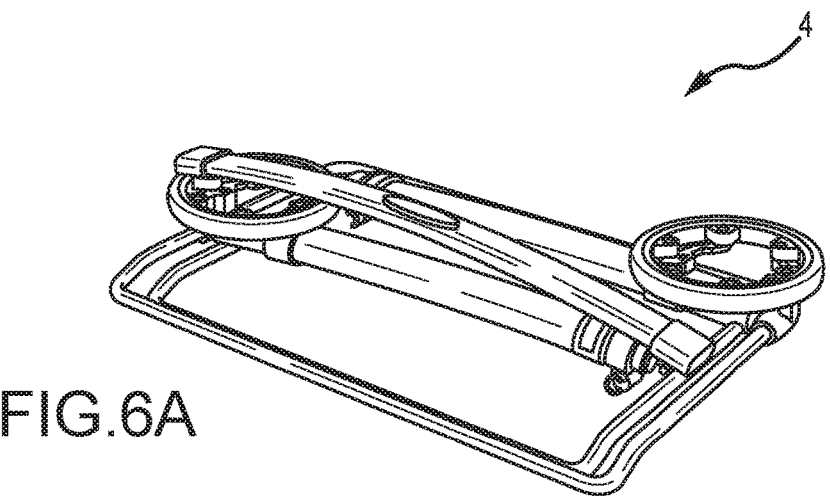
FIG. 6A is a perspective view of a frame system collapsed into a common plane.
Figure 6B:
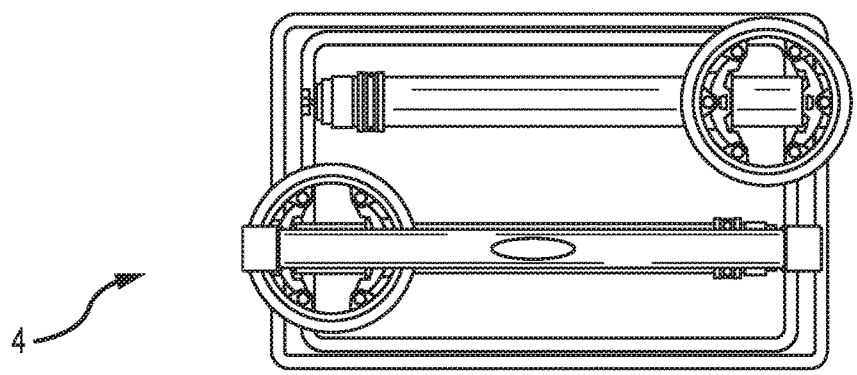
FIG. 6B is a top plan view of a frame system collapsed into a common plane.
Figure 6C:
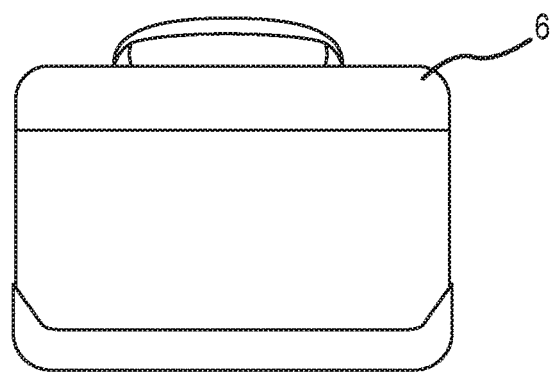
FIG. 6C is a perspective view of a collapsible luggage bag wherein the collapsed stays are disposed within a top pocket of a bag.

FIGS. 5A-5B show the fourth element 22 being rotated about the bottom member 28 to lie in a common plane with the bottom member 28. The handle 12 is articulable such that the handle 12 lies flat against the fourth element 22. FIGS. 6A-6C illustrate a fully collapsed frame 4 that fits within the top pocket 6 of the bag 2 wherein the elements 16, 18, 20, 22 of both stays 8, 10, the handle 12, and the members 26, 28 lie in a common plane.

The fully collapsed frame 4 reduces to a smaller volume, specifically the volume defined by the top and bottom members 26, 28. The reduction may be expressed as a percentage of the pre-collapse volume. In some embodiments, the post-collapse volume is between approximately 12% to 25% of the pre-collapse volume. In various embodiments, the post-collapse volume is between approximately 10% and 15% of the pre-collapse volume.

Figure 7:
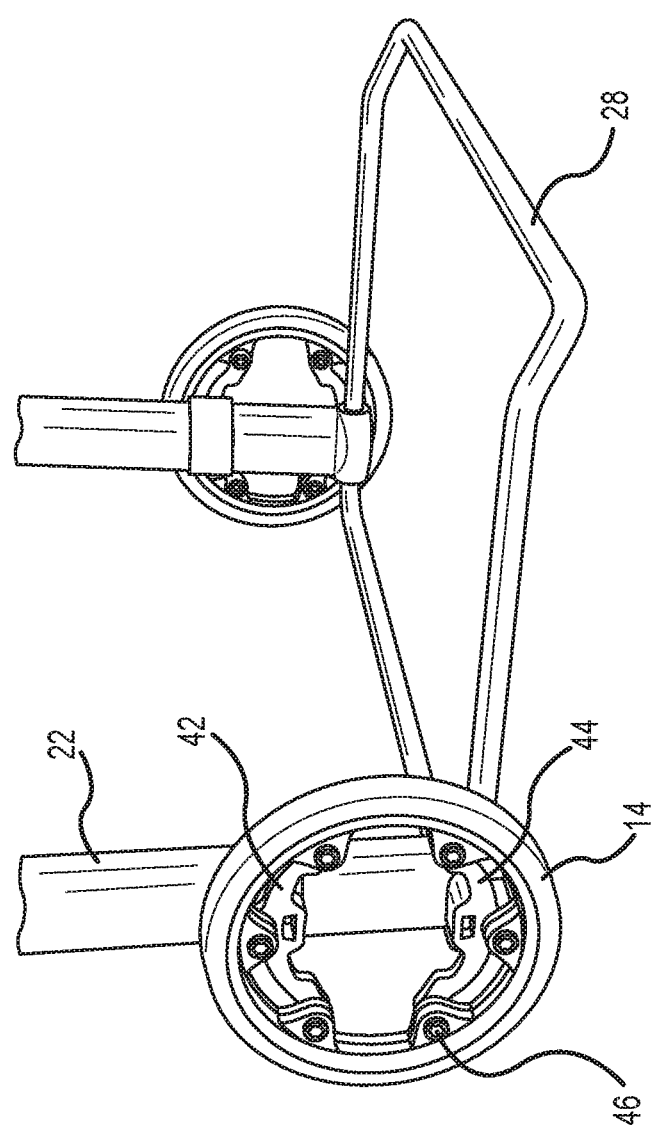
FIG. 7 is a side view of a hubless wheel system disposed on the side of a collapsible luggage bag.

Now referring to FIG. 7, an illustration of the hubless wheel 14 is provided. A top member 42 and a bottom member 44 interconnect the wheel 14 to the fourth element 22, which is rotatably interconnected to the bottom frame member 28. The hubless wheel 14 may function as a stiffener for different components of the frame, including the bottom member 44 and the stays.

Three attachment members 46 are interconnected to the top member 42, and three attachment members 46 are interconnected to the bottom member 44. The attachment members 46, the top member 42, and the bottom member 44 reduce the overall size needed for a smooth bearing surface, and these components provide a larger diameter of a mounting surface to provide additional rigidity to the mounting surface. The six total attachment members 46 are offset by 60 degrees from each other, i.e., the attachment members 46 are evenly spaced. The wheel 14 rotates about the six attachment members 46. It will be appreciated that there may be other numbers of attachment members 46 and other configurations of attachment members 46. For instance, there may be one, two, three, four, five, seven, etc. attachment members 46. Further, the attachment members 46 may not be evenly spaced about an axis. The attachment members 46 may be asymmetrically distributed without sequence, segregated into multiple groups, etc.

Figure 8:
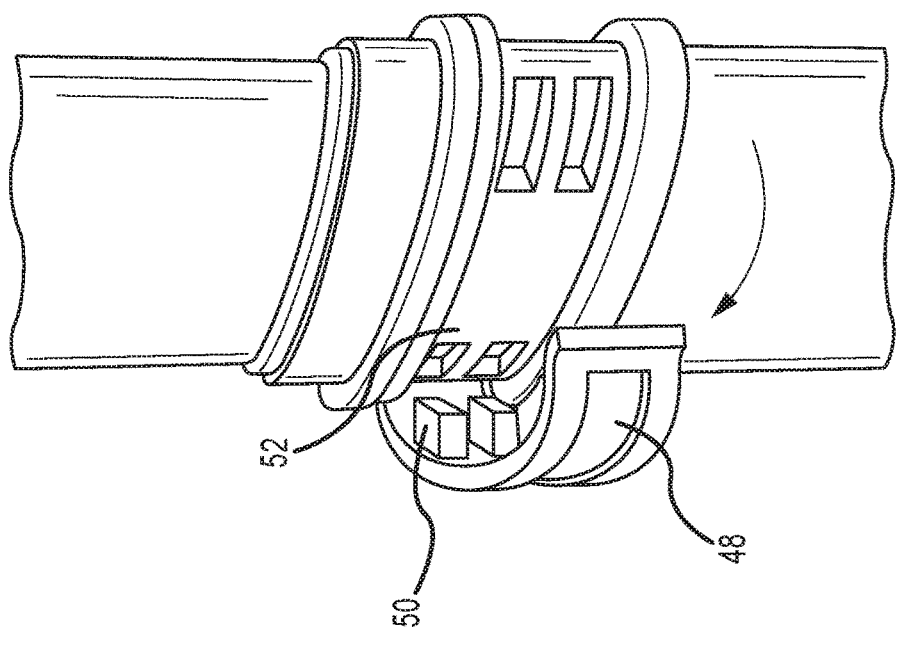
FIG. 8 is a side view of a clamp system having an arm and a plurality of protrusions that correspond to a plurality of recesses.
Figure 8:
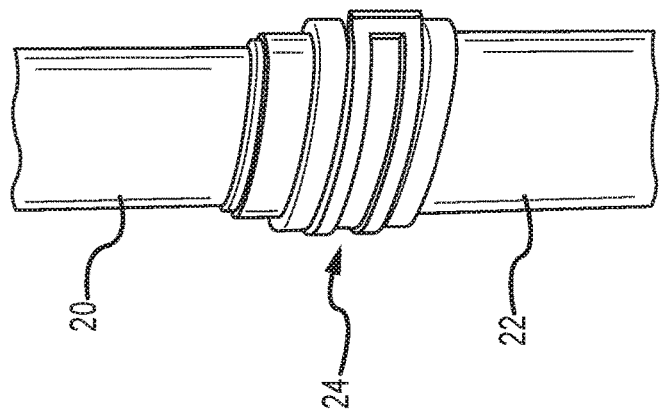

Now referring to FIG. 8, the clamp 24 that determines the relative positioning between the third and fourth elements 20, 22 is provided. The clamp 24 has an open state and a locked state. In the open state, the clamp 24 does not prevent the third and fourth elements 20, 22 from moving relative to each other such that a user may collapse the third element 20 into the fourth element 22. In the locked state, the clamp 24 prevents the third and fourth elements 20, 22 from moving relative to each other.

The clamp 24 comprises an arm 48 that swings away from the third and fourth elements 20, 22 in an open state and folds against the third and fourth elements 20, 22 in a closed state. One or more protrusions 50 are disposed on the inner surface of the arm 48. These protrusions 50 correspond to one or more apertures 52 disposed on an upper end of the fourth element 22. When the clamp 24 is in the closed position, the protrusions 50 pass through the apertures 52 and either contact the third element 20, second element 18, or first element 16 or pass through additional recesses in these elements 20, 18, 16. This protrusion-recess interaction allows the clamp 24 to lock position of these elements 20, 18, 16 relative to the fourth element 22.

Figure 9B:
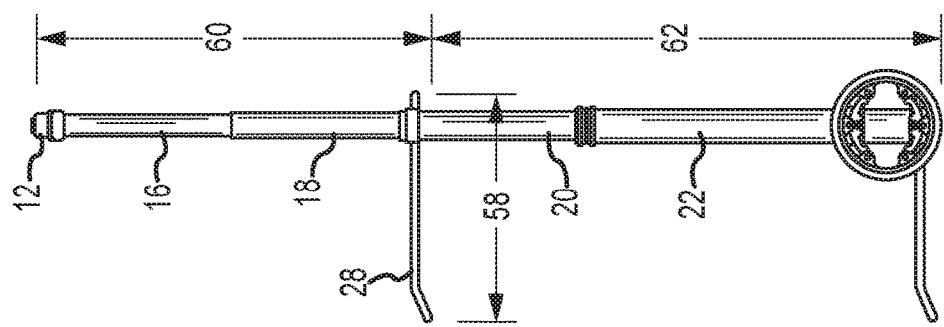
FIG. 9B is a right elevation view of a collapsible luggage bag and the dimensions of the bag.
Figure 9A:
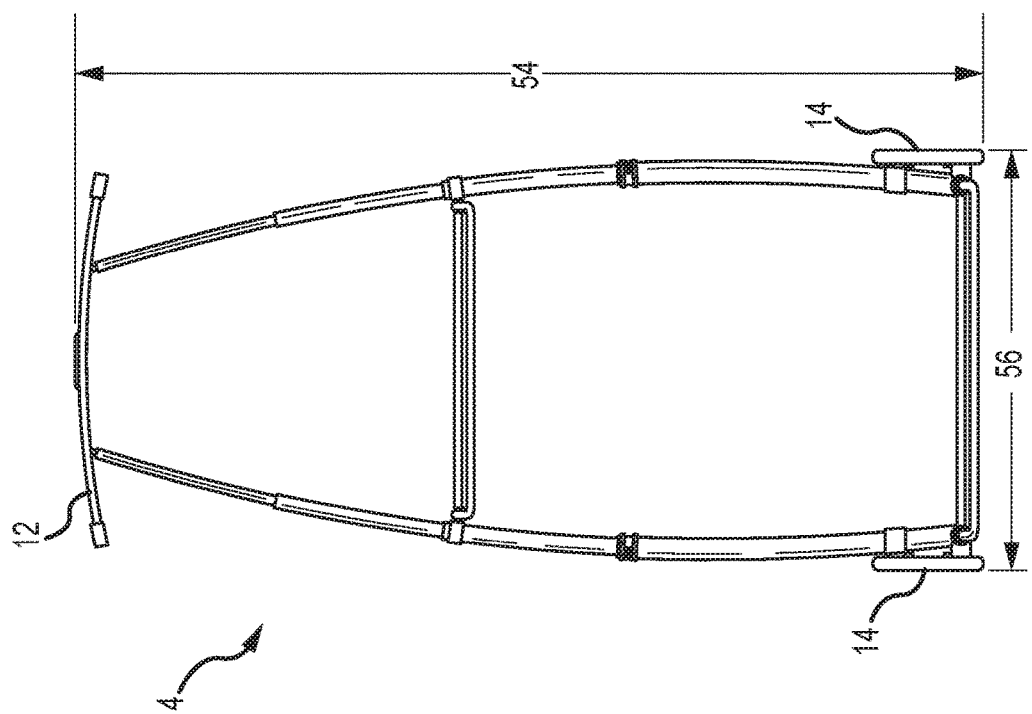
FIG. 9A is a front elevation view of a collapsible luggage bag and the dimensions of the bag.

Now referring to FIGS. 9A and 9B, various dimensions of the bag 2 are provided. In various embodiments, the overall height 54 of the frame 4 in FIG. 9A from the bottom of the wheel 14 to the top of the handle 12 is between approximately 29" and 49" (73.7 cm to 124.5 cm). In some embodiment, the overall height 54 of the frame 4 is between approximately 34" and 44" (86.4 cm to 111.8 cm). In one embodiment, the overall height 54 is approximately 39" (99 cm). In various embodiments, the overall width 56 of the frame 4 in FIG. 9A between the outer edges of the wheels is between approximately 8" and 24" (20.3 cm to 61.0 cm). In some embodiments, the overall width 56 of the frame 4 is between approximately 12" and 18" (30.5 cm to 45.7 cm). In one embodiment, the overall width 56 of the frame 4 is approximately 14" (35.6 cm).

In various embodiments, the depth 58 of the top member 26 is between approximately 4" and 22" (10.2 cm to 55.9 cm). In some embodiment, the depth 58 of the top member 26 is between approximately 8" and 16" (20.3 cm to 40.6 cm). In one embodiment, the depth 58 of the top member 26 is 10" (25.4 cm). In various embodiments, the height 60 of the first and second elements 16, 18 is between approximately 8" and 24" (20.3 cm to 61.0 cm). In some embodiments, the height 60 of the first and second elements 16, 18 is between approximately 12" and 20" (30.5 cm to 50.8 cm). In one embodiment, the height 60 of the first and second elements 16, 18 is approximately 16" (40.6 cm). In various embodiments, the height 62 of the third and fourth elements 20, 22 is between approximately 10" and 34" (25.4 cm to 86.4 cm). In some embodiments, the height 62 of the third and fourth elements 20, 22 is between approximately 16" and 28" (40.6 cm to 71.1 cm). In one embodiment, the height 62 of the third and fourth elements 20, 22 is approximately 22" (55.9 cm).

The description of the invention has been presented for purposes of illustration and description, but is not intended to be exhaustive or limiting of the invention to the form disclosed. Many modifications and variations will be apparent to those of ordinary skill in the art. The embodiments described and shown in the figures were chosen and described in order to best explain the principles of the invention, the practical application, and to enable those of ordinary skill in the art to understand the invention.

While various embodiments of the invention have been described in detail, it is apparent that modifications and alterations of those embodiments will occur to those skilled in the art. Moreover, references made herein to "the invention" or aspects thereof should be understood to mean certain embodiments of the invention and should not necessarily be construed as limiting all embodiments to a particular description. It is to be expressly understood that such modifications and alterations are within the scope and spirit of the invention, as set forth in the following claims.

What is claimed is:

1. A collapsible luggage bag system, comprising:
   a bag having an internal volume;
   a frame selectively interconnected to an exterior surface of said bag, including:
      a first stay having a retracted position and an extended position relative to said bag;
      a second stay having a retracted position and an extended position relative to said bag;
      a handle slideably interconnected to an upper end of said first stay and an upper end of said second stay, said upper ends of said stays are configured to slide along a longitudinal length of said handle as said stays move between said retracted positions and said extended positions;
      a slidable element positioned in a channel on said handle, said channel oriented along said longitudinal length of said handle, wherein at least one of said upper end of said first stay and said upper end of said second stay is rotatably interconnected to said slidable element; and
      wherein said handle is configured to selectively disconnect from said upper end of said first stay and reposition against said second stay such that said frame stores in said internal volume of said bag.

2. The collapsible luggage bag system of claim 1, wherein said first stay and said second stay each comprise a plurality of telescoping elements which allow selective retraction and extension of said stays.

3. The collapsible bag system of claim 2, further comprising:
   a clamp that selectively fixes relative positions of two elements of said plurality of telescoping elements.

4. The collapsible luggage bag system of claim 1, wherein said first stay extends upwardly from said bag, and has an inwardly orientated arcuate shape.

5. The collapsible luggage bag system of claim 1, wherein said first stay and said second stay are symmetric to each other about a vertical plane that bisects said bag.

6. The collapsible luggage bag system of claim 1, further comprising:
   a first hubless wheel on said first stay, wherein said first hubless wheel is configured to lie in a substantially common plane with said frame and is sized to be stored in said internal volume of said bag; and
   a second hubless wheel on said second stay, wherein said second hubless wheel is configured to lie in said substantially common plane with said frame and is sized to be stored in said internal volume of said bag.

7. A method of storing a luggage frame in a collapsible luggage bag, comprising:
   providing a first stay having a retracted position and an extended position;
   providing a second stay having a retracted position and an extended position;
   providing a handle slideably interconnected to an upper end of said first stay and an upper end of said second stay, said upper ends of said stays slide along a longitudinal length of said handle as said stays move between said retracted positions and said extended positions;
   positioning a slideable element in a channel on said handle, said channel oriented along said longitudinal length of said handle, wherein at least one of said upper end of said first stay and said upper end of said second stay is rotatably interconnected to said slideable element;
   disconnecting said first stay from said handle and repositioning said handle against said second stay; and
   folding said first and second stays against a bottom frame member, wherein said first stay, said second stay, said bottom frame member, and said handle are repositioned in a substantially common plane to allow positioning in the perimeter confines of a bag.

8. The method of claim 7, further comprising:
selectively interconnecting said luggage frame to at least one attachment point on an exterior surface of said bag.

9. The method of claim 7, wherein said first stay and said second stay each comprise a plurality of telescoping elements which allow selective retraction and extension of said stays.

10. The method of claim 9, further comprising:
selectively fixing, with a clamp, relative positions of two elements of said plurality of telescoping elements.

11. The method of claim 7, wherein said first stay extends upwardly from said bag, and has an inwardly orientated arcuate shape.

12. The method of claim 7, wherein said first stay and said second stay are symmetric to each other about a vertical plane that bisects said bag.

13. The method of claim 7, further comprising:
providing a first hubless wheel on said first stay, wherein said first hubless wheel is configured to lie in said substantially common plane with said frame and is sized to be stored in an internal volume of said bag; and
providing a second hubless wheel on said second stay, wherein said second hubless wheel is configured to lie in said substantially common plane with said frame and is sized to be stored in said internal volume of said bag.

14. A collapsible luggage bag system, comprising:
a bag having an internal volume;
a frame selectively interconnected to an exterior surface of said bag, including:
a first stay having a retracted position and an extended position relative to said bag, said first stay comprises a plurality of telescoping elements, wherein said first stay extends upwardly from said bag;
a second stay having a retracted position and an extended position relative to said bag, said second stay comprises a plurality of telescoping elements, wherein said second stay extends upwardly from said bag;
a handle having a channel oriented along a longitudinal length of said handle, wherein a protrusion on an upper end of said first stay and a protrusion on an upper end of said second stay are positioned in said channel such that said upper ends of said stays slide along said longitudinal length of said handle as said stays move between said retracted positions and said extended positions;
a first hubless wheel on said first stay;
a second hubless wheel on said second stay; and
wherein said handle is configured to selectively disconnect from said upper end of said first stay and reposition against said second stay such that said frame lies in a substantially common plane and allows for selective storage in said internal volume of said bag.

15. A collapsible luggage bag system, comprising:
a bag having an internal volume;
a frame selectively interconnected to an exterior surface of said bag, including:
a first stay having a retracted position and an extended position relative to said bag;
a second stay having a retracted position and an extended position relative to said bag;
a handle slideably interconnected to an upper end of said first stay and an upper end of said second stay;
a channel on said handle, said channel oriented along a longitudinal length of said handle, wherein a protrusion on said upper end of said first stay and a protrusion on said upper end of said second stay are positioned in said channel such that said upper ends of said stays slide along said longitudinal length of said handle as said stays move between said retracted positions and said extended positions; and
wherein said handle is configured to selectively disconnect from said upper end of said first stay and reposition against said second stay such that said frame stores in said internal volume of said bag.

16. The collapsible luggage bag system of claim 15, wherein said upper end of said first stay comprises opposing protrusions positioned in recesses in said channel, and said upper end of said second stay comprises opposing protrusions positioned in recesses in said channel.

17. A method of storing a luggage frame in a collapsible luggage bag, comprising:
providing a first stay having a retracted position and an extended position;
providing a second stay having a retracted position and an extended position;
providing a handle slideably interconnected to an upper end of said first stay and an upper end of said second stay;
providing a channel on said handle, wherein said channel is oriented along a longitudinal length of said handle;
sliding a protrusion on said upper end of said first stay and a protrusion on said upper end of said second stay in said channel along said longitudinal length of said handle as said stays move between said retracted positions and said extended positions;
disconnecting said first stay from said handle and repositioning said handle against said second stay; and
folding said first and second stays against a bottom frame member, wherein said first stay, said second stay, said bottom frame member, and said handle are repositioned in a substantially common plane to allow positioning in the perimeter confines of a bag.

18. The method of claim 17, wherein said upper end of said first stay comprises opposing protrusions positioned in recesses in said channel, and said upper end of said second stay comprises opposing protrusions positioned in recesses in said channel.

* * * * *